United States Patent Office 3,503,921
Patented Mar. 31, 1970

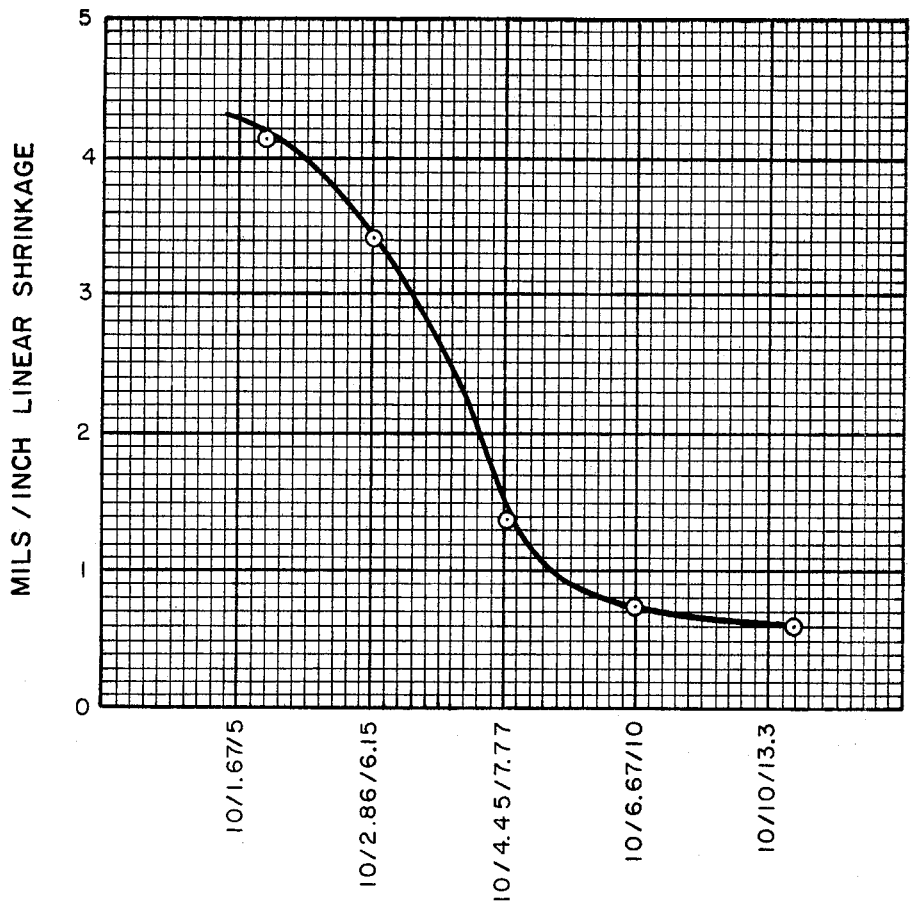

3,503,921
POLYESTER PREMIX CONTAINING POLY-
STYRENE AND MONOMERIC STYRENE
Alfred Souza, Jr., and Albert R. Kurkowski, Dover, N.J.,
and Austin M. Thornton, Jr., Dallas, Tex., assignors, by
mesne assignments, to W. R. Grace & Co., New York,
N.Y., a corporation of Connecticut
Filed Oct. 18, 1967, Ser. No. 676,125
Int. Cl. C08g 51/06, 51/10; C08k 1/14
U.S. Cl. 260—40            6 Claims

ABSTRACT OF THE DISCLOSURE

A polyester resin suitable for molding prepared from a mixture of:

(1) an unsaturated polyester such as diethylene dipropylene maleate and a vinyl monomer such as monostyrene; and
(2) a blend of a vinyl monomer such as monostyrene and a styrene based polymer such as polystyrene.

The resin is catalyzed with per catalysts such as benzoyl peroxide and T-butyl perbenzoate. It also contains lubricants, pigments, and fillers such as calcium carbonate, asbestos, and glass fibers.

BACKGROUND OF THE INVENTION

This invention relates to polyesters prepared from an unsaturated polyester, a monomer containing a $CH_2=C<$ group, and a polymer derived at least in part from at least one vinyl monomer of the class consisting of styrene, vinyl chloride and diallyl phthalate.

Polyester resins containing fillers and reinforcements have been used for premix transfer molding, compression molding, injection molding, and mat and preform molding for some time.

In the premix molding process, the molding compound is prepared, or premixed, to a putty-like consistency before it is placed into the mold. This process permits the elimination of the necessity and expense of making preforms or die cut mat blanks and allows a greater variety of fibers and fillers to be used in their simplest forms. It also makes possible rapid molding of parts with varying wall thicknesses, intricate contours, molded inserts, holes, slots, grooves, and bosses with a consequent reduction in cost and minimum waste. The molding may be done in transfer molds, compression molds or injection molds.

Mat and preform matched die molding methods are utilized for the high speed production of molded products which must exhibit high impact strength, excellent surfaces, and uniform appearance. The two basic methods of fabrication differ in the type of glass reinforcement used in fabricating the molded product. Mat reinforcement is most appropriate when articles to be molded are basically flat, or incorporate very few and well-distributed changes in the structural matter. Serving trays and electrical sheets are examples. Preform reinforcements are generally used where the article to be molded consists of a variety of curves within the part itself. Examples are chairs, tote boxes, and automotive parts.

Existing polyester resins, while generally performing satisfactorily in the above molding processes, are subject to several deficiences. Parts molded from such polyesters are subject to shrinkage and warpage upon cooling, and often the molded product exhibits surface waviness, roughness and sink markings, especially in the case of articles having relatively intricate shapes and of sections having non-uniform thickness. It is an object of this invention, therefore, to overcome the above-noted deficiencies and provide a polyester resin system which, when molded, exhibits relatively low shrinkage, non warp, and improved surface characteristics.

SUMMARY OF THE INVENTION

In accordance with this invention, it has been found that the use of the following molding compositions provides molded articles exhibiting relatively low shrinkage, non warp, and excellent surface characteristics. The molding composition of this invention broadly comprises a mixture of:

(a) About 10 parts of polymerizable unsaturated polyester of a polyhydric alcohol and a polycarboxylic acid;
(b) About 5.6 to 50 parts of at least one copolymerizable ethylenically unsaturated monomeric compound containing at least one $CH_2=C<$ group and capable of copolymerizing with said polyester; and
(c) About 1.5 to 30 parts of a polymer derived at least in part from at least one vinyl monomer of the class consisting of styrene, vinyl chloride and diallyl phthalate.

A presently preferred embodiment of the invention comprises a thermosetting molding composition comprising a mixture of:

(a) About 10 parts of an unsaturated polyester derived from dipropylene diethylene glycol and maleic anhydride;
(b) About 6 to 35 parts of styrene monomer;
(c) About 1.6 to 18 parts of polystyrene;
(d) About 0.05 to 5.75 parts of a peroxide catalyst; and
(e) About 4.0 to 525 parts of filler material, said filler including about 0 to 260 parts of glass fibers.

Further objects and features of the present invention will become apparent by reference to the following specification and drawings:

DETAILED DESCRIPTION

FIGURE 1 is a graph showing the relationship of molding compound formulations to linear shrinkage in the mold. The method of determining linear shrinkage as used in the present invention is as follows:

(1) A mold capable of producing parts approximately 6" long x ½" wide x ¼" thick is premeasured at 77° F.± 2° F. These dimensions are then set as the base dimensions to calculate shrinkage.

(2) The molding compound is then molded, removed and cooled to 77° F.±2° F.

(3) These bars are then measured and the following calculations are used to determine linear shrinkage:

Linear shrinkage (inches/inch) =

$$\frac{\text{Length of mold at 77° F.} - \text{Length of bar at 77° F.}}{\text{Length of bar at 77° F.}}$$

Polymerizable unsaturated polyhydric alcohol-polycarboxylic acid polyesters useable in the practice of the invention may be prepared by reaction of one or more polyhydric alcohols and one or more polybasic acids. The proportion of polyhydric alcohols having more than two hydroxy groups, such as glycerol or pentaerythritol, and the proportion of polycarboxylic acids having more than two carboxy groups, such as citric acid, preferably is small so that in the production of the polyester there may be maximum esterification of the hydroxy and carboxy groups without attainment of excessive viscosity (i.e., through cross-linking).

A typical example of a polyester useful in this invention is a product prepared by the reaction of (1) an unsaturated dicarboxylic acid such as maleic, fumaric, itaconic, or citraconic or mesaconic acid or anhydride with (2) a dihydric alcohol such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (in either the alpha or beta position) such as monoformin or monoacetin, any monoether of glycerol with a monohydric alcohol such as monomethylin or monoethylin, or any dihydroxy alkane, in which the hydroxy radicals are attached to carbon atoms that are primary or secondary or both, in the series from dihydroxy butane to dihydroxy decane.

Part of the unsaturated dicarboxylic acid may be replaced by a saturated dicarboxylic acid, such as any normal acid in the series from oxalic acid and malonic acid to sebacic acid, or any benzene dicarboxylic, such as ortho phthalic, meta phthalic, or para phthalic acid or anhydride, naphthalene dicarboxylic or cyclohexane dicarboxylic acid, or diglycolic, dilactic or resorcinol diacetic acid. All of the unsaturated acid may be replaced by a saturated acid if a polyhydric alcohol is present whose molecule has two or three free hydroxy groups and consists of an ether of one or two molecules of allyl or methallyl alcohol with one molecule of a polyhydroxy compound such as glycerol, pentaglycerol, pentaerythritol or butanetetrol-1,2,3,4, a trihydroxy normal alkane having from four to five carbon atoms such as butanetriol-1,2,3 or a monoalkyl ether of pentaerythritol or butanetetrol-1,2,3,4 in which the alkyl radical has from one to four carbon atoms and has from one to two hydrogen atoms attached to the same carbon atoms as the ether linkage, such as the monomethyl or monoisobutyl ether of pentaerythritol.

In the practice of the invention the preferred polymerizable unsaturated polyhydric alcohol-polycarboxylic acid polyesters are the so-called "linear" polyesters, i.e. those which have very little cross-linking in the polyester molecules, as evidenced by the fact that such polyesters are soluble in solvents such as acetone. Such polyesters are formed mainly by esterification of a dihydric alcohol and a dibasic acid. Of course, such polyesters are really only a "substantially" linear since it is not possible to avoid all cross-linking, at least through the unsaturated bonds in the polyester molecules. In fact, a linear (or substantially linear) polyester may be obtained even though in the preparation of such polyester a small proportion of the dihydric alcohol (e.g., less than about 5 mole percent of the alcohol) is replaced by a polyhydric alcohol containing more than two alcohol radicals, such as glycerol or pentaerythritol, or a small proportion of the dibasic acid (e.g., less than about 5 mole percent of the acid) is replaced by a polybasic acid containing more than two acid radicals, such as citric acid. The preferred linear polyester for use in the practice of the invention is prepared by carrying out the esterification reaction substantially to completion (i.e., to an acid number of less than about 40) without permitting substantial (addition) polymerization to take place. Although the esterification reaction is usually carried out under an inert gas atmosphere so as to exclude oxygen, various inhibitors may be used to prevent appreciable polymerization of the polyester during the esterification reaction.

In the preparation of the polymerizable unsaturated polyester, any of the usual modifiers such as monobasic acids and monohydric alcohols may also be added. The larger the proportions of monobasic acids and monohydric alcohols, the lower is the average number of acid and alcohol residues in the resulting polyester molecules and the lower is the viscosity of the polyester. On the other hand, the more nearly equal the molecular proportions of dibasic acid and dihydric alcohol, the greater is the average number of residues in the resulting polyester molecules and the greater is the viscosity. The proportions of ingredients used are those proportions that produce a polymerizable polyester of the desired viscosity. Other properties of the polyester, such as solubility in various solvents, also may be varied by selecting various reacting ingredients and varying their proportion. The infusibility, hardness and inertness of the product obtained by polymerization of the polyester may be increased by varying the initial reacting ingredients to increase the average number of double bonds per molecule of the polymerizable polyester.

Especially preferred polyesters are those derived from 0–100% diethylene, dipropylene glycol and 100% to 0% maleates and/or fumarates, orthophthalic, isophthalic and adipic acids or anhydrides, modified diethylene, dipropylene, ethylene, propylene or neopentyl maleates or fumarates; as well as bisphenol modified and halogenated or phosphorus containing acids or glycols which yield chemical and flame resistant polyesters. These compounds are preferred from a standpoint of economics and the desirable properties they produce in the end product.

The copolymerizable ethylenically unsaturated monomeric compounds contain at least one $CH_2=C<$ group to cross link with the unsaturated polyester. Styrene, vinyl toluene and diallyl phthalate are presently preferred as the cross-linking monomer because of their availability, reactivity and desirable properties, although many other monomers may also be employed. Such other monomers include divinyl benzene, alpha-methyl styrene, chloro- and fluoro-styrene, dimethallyl phthalate, triallyl cyanurate, allyl diglycolate, diallyl phenyl phosphonate, diethyene glycol bis (allyl carbonate), 1,2-propylene glycol bis (allyl carbonate), bis (allyl lactate) carbonate, allyl succinyl allyl glycolate, allyl maleate, methallyl maleate, alkyl methacrylates such as methyl methacrylate and ethyl methacrylate, alkyl acrylates such as methyl acrylate, ethyl acrylate, propyl acrylate and butyl acrylate, vinyl acetate, allyl acetate, tri allyl isocyanurate, trishydroxy ethylisocyanurate, tri allyl cyanurate, and the like. These monomers may be used alone or in combination. The presently preferred concentration of monomer ranges from about 5.6 to 50 parts monomer per ten parts polyester, more preferably between about 6 to 35 parts of monomer per ten parts polyester and most preferably from about 7 to 14 parts monomer per ten parts polyester. Below the preferred concentration the ability to cross-link the polyester is reduced. Above the preferred concentration too much free monomer is available to homopolymerize.

The polymers used in the instant invention include polyvinyl chloride, diallyl phthalate polymers, styrene homopolymers and copolymers of styrene, and mixtures of the above and other resins. Examples of such copolymers are styrene-acrylonitrile (SAN) containing from 60–80% styrene and 20–40% acrylonitrile, acrylonitrile-butadiene-styrene polymers containing from 50–75% styrene, 15–40% acrylonitrile, and 1–35% butadiene (ABS), and rubber modified polystyrene containing from 1–50% rubber. The vinyl monomer from which these polymers are derived is preferably present in amounts ranging from about 40% to 100%. The polymer is present in amounts ranging from about 1.5 to 30 parts of polyester, more preferably in amounts ranging from about 1.6 to 18 parts of polymer per 10 parts of polyester and most preferably in amounts ranging from 4.4 to 10 parts polymer per 10 parts polyester.

The mixture of polyester, monomer, and polymer may be cured by the action of heat alone, or preferably by the addition to the mass of suitable curing catalysts. Such catalysts include organic peroxides such as benzoyl peroxide, T-butylperbenzoate, cyclohexanone peroxide, lauryl peroxide, isopropylbenzene hydroperoxide, tertiary butylbenzene hydroperoxide, methyl ethyl ketone peroxide and 1-hydroxy cyclohexyl hydroperoxide-1. Also useful in the present invention are azo type catalysts such as azo-bis-isobutyronitrile. The catalyst concentration will range from about .05 to 5.75 parts catalyst per 10 parts polyester. The rate of cure of the composition may also be modified by the addition of suitable inhibitors such as hydroquinone, tertiary butyl catechol, benzaldehyde or tetrachloroquinone and of suitable promoters such as certain amines like dimethyl aniline, diethyl aniline, di-n-propyl aniline, dimethyl-para-toluidine, para-diethylamino azobenzene and dimethyl meta-amino-phenol and metallic salts such as cobalt and manganese naphthenate.

Fillers are preferably added to the molding composition to reduce the resin requirements and/or enhance the physical properties of the molded object. Examples are mineral fillers such as clay, ground limestone or whiting gypsum, talc, and cellulose in any form. Aluminum hydrate filler may be used to impart flame resistance. Additional fillers also useful as reinforcing agents include chopped glass fiber, sisal, asbestos and other synthetic fibers such as nylon, polyester, and acrylic fibers. In the presently preferred embodiment of the invention, the filler will include from about 0 to 260 parts of glass fiber per 10 parts of unsaturated polyester in the molding composition. Total filler content will range from about 4 to 525 parts per 10 parts polyester depending on the application.

Additional additives such as plasticizers, mold lubricants and coloring matter such as pigments or dyes are also usually present in the molding composition. The amount used in the case of each of such additives being the usual amount consistent with its particular function in the molding composition.

In a preferred process for preparing a molding composition for use in compression molding, 75% of an unsaturated polyester is usually preblended with, e.g. 25% monomer in order to make a liquid for ease of handling; and the remaining monomer is preblended in equal amounts with the normally solid polymer to make a syrup. Polystyrene syrup is not mixed with polyester because they will separte out. These two preblends are then shipped to the molder where the polyester premix is prepared as follows:

A lubricant, pigment, and part of the filler are mixed together in a kneader type mixer. The polyester/monomer preblend is then mixed with the catalyst in a separate kettle and subsequently poured into the mixer and blended thoroughly with the ingredients contained therein. The polymer/monomer preblend is then added to the mixer and blended with the other ingredients until they are well mixed. Finally, the glass fibers portion of the filler is added and the mixture is kneaded to a smooth wetted mass.

In an alternate process, one of the preblends and a catalyst may be added initially to the mixer, and the desired plasticizer, filler and part of the pigment is added later. Subsequently, the other preblend is added; and finally the glass fibers are mixed in.

The composition is then compression molded at temperatures ranging from about 275° F. to 310° F., pressures from about 300 to 2000 p.s.i., for about 30 to 300 seconds depending on the size and shape of the product. However, the composition can be molded also by transfer molding and injection molding operations as well as any of the methods generally employed in molding thermosetting resins.

Several examples are set forth below to illustrate the nature of the invention and the manner of carrying it out. However, the invention should not be considered as being limited to the details thereof. All parts are by weight unless otherwise indicated.

EXAMPLE 1

Combine and mix to an even consistency for about 4 minutes in a 2.5 gallon double blade rectangular-trough type kneader equipped with 180° spiral blades, the following ingredients.

Ingredients: Quantity, parts
Zinc stearate (lubricant) _____ 30
Mapico black (pigment) _____ 24
Calcium carbonate (filler) _____ 945
Asbestos (filler) _____ 945

Blend and mix for 15 minutes in a separate kettle containing a paddle type agitator, the following ingredients.

Ingredients: Quantity, parts
Preblend of 75% diethylene dipropylene maleate polyester derived from 50 moles diethylene glycol, 50 moles dipropylene glycol, and 100 moles maleic anhydride and 25% styrene monomer _____ 420
Tertiary butyl perbenzoate (catalyst) _____ 8.4
Benzoyl peroxide/tri cresol phosphate (50/50 mixture) (catalyst/plasticizer) _____ 8.4

Add these mixed ingredients to the first ingredients in the kneader and blend for 15 more minutes.

Add the following ingredient to the kneader and blend for 5 minutes.

Ingredient: Quantity, parts
Preblend syrup of 50% styrene monomer and 50% polystyrene _____ 420

|  | Formulation ratio | | Formulation based on 10 parts polyester | | | |
| --- | --- | --- | --- | --- | --- | --- |
| Example | Percent preblend of 75% polyester and 25% styrene | Percent preblend of 50% styrene and 50% polystyrene | Polyester | Polystyrene | Styrene monomer | Linear shrinkage, mils per inch |
| 2 | 75 | 25 | 10 | 2.26 | 5.575 | 3.9 |
| 3 | 70 | 30 | 10 | 2.86 | 6.15 | 3.4 |
| 4 | 60 | 40 | 10 | 4.45 | 7.77 | 1.35 |
| 5 | 50 | 50 | 10 | 6.67 | 10 | 0.7 |
| 6 | 40 | 60 | 10 | 10 | 13.3 | 0.6 |

Add slowly over a period of 4–5 minutes and blend thoroughly for 5–10 minutes the following ingredient until the entire mixture is well dispersed and the glass fibers are well wetted.

Ingredient: Quantity, parts
Glass fibers—¼ inch long (filler) _____ 240

Place a portion of the resin mixture into a compression mold and mold for 30 seconds at 800 p.s.i. and 295° F.

The relative ratio of polyester to styrene monomer to polystyrene based on ten parts of polyester in this example is as follows.

Ingredients: Quantity, parts
Polyester _____ 10
Styrene monomer _____ 10
Polystyrene _____ 6.67

EXAMPLES 2–6

The following examples were performed in accordance with the procedure of Example 1. The relative proportions of polyester, polystyrene and styrene monomer were changed as indicated; and the glass fibers were eliminated to clarify the shrinkage data shown below. The effect of formulation on linear shrinkage is shown graphically in FIG. 1.

EXAMPLE 7

Repeat Example 1, substituting styrene acrylonitrile containing 70% styrene, 30% acrylonitrile for polystyrene.

EXAMPLE 8

Repeat Example 1 substituting acrylonitrile-butadiene-styrene polymer for polystyrene.

EXAMPLE 9

Repeat Example 1 substituting polyvinyl chloride for polystyrene.

EXAMPLE 10

Repeat Example 1 substituting diethylene dipropylene isophthalic maleate for diethylene dipropylene maleate.

EXAMPLE 11

Repeat Example 1 substituting diethylene, dipropylene, propylene ortho phthalic maleate for diethylene dipropylene maleate.

EXAMPLE 12

Repeat Example 1 substituting vinyl toluene for styrene monomer.

EXAMPLE 13

Repeat Example 1 substituting divinyl benzene for styrene monomer.

EXAMPLE 14

Repeat Example 1 substituting diallyl phthalate monomer for styrene monomer.

EXAMPLE 15

Repeat Example 1 substituting diallyl phthalate monomer for styrene monomer and diallyl phthalate polymer for polystyrene.

EXAMPLE 16

Repeat Example 1, substituting fumaric acid for maleic anhydride.

EXAMPLE 17

Repeat Example 1, substituting 50 moles of isophthalic acid for 50 moles of maleic anhydride.

EXAMPLE 18

Repeat Example 1, substituting 50 moles of adipic acid for 50 moles of maleic anhydride.

EXAMPLE 19

Repeat Example 1 substituting 50 moles of orthophthalic acid for 50 moles of maleic anhydride.

EXAMPLE 20

Repeat Example 1 substituting 25 moles of isophthalic acid and 25 moles of orthophthalic acid for 50 moles of maleic acid.

EXAMPLE 21

Repeat Example 1 substituting 25 moles of orthophthalic acid and 25 moles of adipic acid for 50 moles of maleic acid.

While exemplary embodiments of the invention have been described, the true scope of the invention is to be determined from the following claims.

What is claimed is:
1. A molding composition consisting essentially of a mixture of:
   (a) about 10 parts of a polymerizable unsaturated polyester of; (i) a polyhydric substance selected from the group consisting of diethylene glycol, dipropylene glycol, neopentyl glycol, bisphenol, and mixtures thereof; and (ii) a polycarboxylic acid selected from the group consisting of maleic acid, fumaric acid, anhydrides thereof, and mixtures thereof with an acid selected from the group consisting of orthophthalic acid, isophthalic acid, adipic acid, and anhydrides thereof;
   (b) about 5.6 to 50 parts of monomeric styrene; and
   (c) about 1.5 to 30 parts of polystyrene.
2. The molding composition of claim 1 wherein the polymerizable unsaturated polyester is a diethylene dipropylene maleate polyester derived from 50 moles of diethylene glycol, 50 moles of dipropylene glycol, and 100 moles of maleic anhydride.
3. A thermosetting molding composition consisting essentially of a mixture of:
   (a) about 10 parts of an unsaturated polyester derived from 50 moles of diethylene glycol, 50 moles of dipropylene glycol, and 100 moles of maleic anhydride;
   (b) about 6 to about 35 parts of styrene monomer;
   (c) about 1.6 to 18 parts of polystyrene;
   (d) about .05 to 2.5 parts of a peroxide catalyst; and
   (e) about 4.0 to 525 parts of filler material said filler including about 0 to 260 parts of glass fibers.
4. The molding composition of claim 3 wherein the styrene monomer is present in amounts ranging from about 7 to about 14 parts.
5. The molding composition of claim 4, wherein the polystyrene is present in amounts ranging from about 4.4 to 10 parts.
6. A molding composition consisting essentially of a mixture of:
   (a) about 10 parts of a polymerizable unsaturated polyester of; (i) a polyhydric alcohol selected from the group consisting of an alkylene glycol having 2–10 carbon atoms, a dialkylene glycol having 4–18 carbon atoms, monoformin, monoacetin, monomethylin, monoethylin, and mixtures thereof; and (ii) a polycarboxylic acid selected from the group consisting of maleic acid, fumaric acid, itaconic acid, citraconic acid, mesaconic acid, anhydrides thereof, and mixtures thereof with a dicarboxylic acid selected from the group consisting of o-phthalic acid, m-phthalic acid, p-phthalic acid, normal alkanedioic acids having 2–10 carbon atoms, and anhydrides thereof;
   (b) about 5.6 to 50 parts of monomeric styrene; and
   (c) about 1.5 to 30 parts of polystyrene.

References Cited

UNITED STATES PATENTS

| | | | |
|---|---|---|---|
| 3,261,886 | 7/1966 | Lowry | 260—862 |
| 3,256,362 | 6/1966 | Craubner | 260—862 |
| 3,051,679 | 8/1962 | Forsyth | 260—862 |
| 2,340,109 | 1/1944 | D'Alelio | 260—862 |

MORRIS LIEBMAN, Primary Examiner

SANDRA M. PERSON, Assistant Examiner

U.S. Cl. X.R.

260—862